(12) United States Patent
Hartwich (10) Patent No.: US 9,740,655 B2
(45) Date of Patent: Aug. 22, 2017

(54) DATA TRANSMISSION USING A PROTOCOL EXCEPTION STATE

(71) Applicant: Robert Bosch GmbH, Stuttgart (DE)

(72) Inventor: Florian Hartwich, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 224 days.

(21) Appl. No.: 14/652,743

(22) PCT Filed: Dec. 19, 2013

(86) PCT No.: PCT/EP2013/077515
§ 371 (c)(1),
(2) Date: Jun. 16, 2015

(87) PCT Pub. No.: WO2014/096272
PCT Pub. Date: Jun. 26, 2014

(65) Prior Publication Data
US 2015/0339254 A1    Nov. 26, 2015

(30) Foreign Application Priority Data

Dec. 20, 2012    (DE) .................. 10 2012 224 024

(51) Int. Cl.
*G06F 1/24*    (2006.01)
*G06F 1/32*    (2006.01)
(Continued)

(52) U.S. Cl.
CPC ...... *G06F 13/4221* (2013.01); *G06F 13/4068* (2013.01); *H04L 1/0083* (2013.01);
(Continued)

(58) Field of Classification Search
CPC ......... G06F 13/40; G06F 13/42; H04L 12/40; H04L 11/08; H04L 69/18
See application file for complete search history.

(56) References Cited

U.S. PATENT DOCUMENTS 5,524,213 A * 6/1996 Dais ................... H04L 12/4135
370/462
5,854,454 A * 12/1998 Upender ........... H04L 12/40163
187/247
(Continued)

FOREIGN PATENT DOCUMENTS

WO    WO 2012/136547    10/2012

OTHER PUBLICATIONS

Robert Bosch GmbH : « CAN with Flexible Data-Rate Specification Version 1.0 », Apr. 17, 2012.
(Continued)

*Primary Examiner* — Henry Tsai
*Assistant Examiner* — Christopher a Daley
(74) *Attorney, Agent, or Firm* — Norton Rose Fulbright US LLP; Gerard Messina (57) ABSTRACT

A method for exchanging data between nodes which are connected to each other by a bus system, in which messages that contain data are exchanged according to a first communication protocol; the messages are made up of a sequence of bits; at least one control bit having a predetermined position within the message, which is exchanged according to the first protocol, must have a predetermined value; for each message, one node has the role of transmitter and at least one other node, as receiver, receives the message and monitors the message for errors, wherein by transmission of the control bit having a value differing from the predetermined value, at least one first receiver is transferred into a protocol exception state, so that it suspends error monitoring, and the transmitter, after transmitting the control bit, begins to transmit further data according to a second protocol to at least one second receiver.

20 Claims, 4 Drawing Sheets

(51) Int. Cl.
  *H04L 12/40*   (2006.01)
  *G06F 13/40*   (2006.01)
  *G06F 13/42*   (2006.01)
  *H04L 1/00*    (2006.01)
  *H04L 29/06*   (2006.01)
  *H04L 1/08*    (2006.01)

(52) U.S. Cl.
  CPC .......... *H04L 12/4013* (2013.01); *H04L 69/18* (2013.01); *H04L 1/08* (2013.01); *H04L 2001/0094* (2013.01)

(56) References Cited

U.S. PATENT DOCUMENTS

| | | | | |
|---|---|---|---|---|
| 6,104,726 | A * | 8/2000 | Yip | H04J 3/1688 370/468 |
| 2002/0112109 | A1* | 8/2002 | Jorgenson | G06F 13/409 710/305 |
| 2007/0271490 | A1* | 11/2007 | Aldereguia | G06F 11/1008 714/746 |
| 2010/0150176 | A1* | 6/2010 | Yakashiro | H04L 12/40006 370/475 |
| 2010/0158045 | A1* | 6/2010 | Shin | H04L 12/40071 370/473 |
| 2010/0192051 | A1* | 7/2010 | Kabulepa | H04L 1/0061 714/807 |
| 2010/0229046 | A1* | 9/2010 | Fuehrer | G06F 9/546 714/43 |
| 2011/0125940 | A1* | 5/2011 | Aue | H04L 12/40032 710/105 |
| 2015/0312052 | A1* | 10/2015 | Horst | H04L 61/2038 710/106 |
| 2016/0254924 | A1* | 9/2016 | Hartwich | H04L 69/10 370/468 |

OTHER PUBLICATIONS

« Defense Advanced Research Projects Agency Information Sciences Institute University of Southern California 4676 Admiralty Way Mari : » Internet Protocol Darpa Internet Program Protocol Specification ; Sep. 1, 1981.

* cited by examiner

DATA TRANSMISSION USING A PROTOCOL EXCEPTION STATE

FIELD OF THE INVENTION

The present invention relates to a method for the exchange of data between nodes that are connected to one another by a bus system, in which the messages that contain the data are exchanged according to a first communication protocol; the messages are made up of a sequence of bits and at least one control bit having a predetermined position within the message, which is exchanged according to the first communication protocol, must have a predetermined value; and for each message, one node has the role of transmitter and at least one other node, as receiver, receives the message and monitors the message for errors.

BACKGROUND INFORMATION

Such a method is to be found, for example, in communication controllers of the Controller Area Network (CAN). It is discussed in the BOSCH CAN-Specification 2.0, for instance, which can be downloaded from the Robert Bosch GmbH website http://www.semiconductors.bosch.de. The bus system is usually a wiring pair such as a twisted copper cable. The CAN protocol is widespread in the automotive industry, industrial automation or in building networking, for instance. The messages to be transmitted in the CAN protocol have a header section, a data field and a trailer section, the data to be transmitted being contained in the data field. The header section of the message contains a start-of-frame bit, an arbitration field, as well as a control field. The arbitration field includes the identifier, which determines the priority of the message. CAN supports identifier lengths of 11 bits ("standard format" or "base format") and 29 bits ("extended format"). The control field includes a data length code, which specifies the length of the data field. The trailer section of the message has a CRC field, an acknowledge field and an end-of-frame field. This CAN protocol is referred to hereinafter as "Norm CAN". Bit rates up to 1 Mbit/s are reached via the Norm CAN.

The roles of transmitter and receiver for the messages to be transmitted are assigned among the nodes by an arbitration process based on information from the header section of the messages. In this context, arbitration process means that based on an identifier contained in the message, it is negotiated which node will receive transmit access to the bus when several nodes are attempting simultaneously to transmit a message, in doing which, given unambiguously assigned identifiers, the transmit access is awarded by the arbitration process to exactly one node. In the case of CAN, the at least one control bit assumed for our invention is contained in the header section and, for example, is a reserved bit in the arbitration field or in the control field that, for instance, must always be transmitted dominantly with a predetermined value.

Many other communication systems recognize similar reserved bits, which are always transmitted with a fixed value. Hereinafter, the inventive idea is described based on the CAN. However, the invention is not thereby limited to CAN bus systems, but rather may be carried out starting from all bus systems that satisfy the features according to the definition of the species of the method claimed.

The introduction of ever more highly networked applications, e.g., of assistance systems in vehicles or of networked control systems in industrial facilities, leads to the general demand that the bandwidth for serial communication must be increased.

Two factors limit the effective data transfer rate in Norm CAN networks, namely, on one hand, the bit duration, thus, the length of one bit in time, which is limited downward by the function of the CAN bus arbitration process, and on the other hand, the relationship between the number of data bits and control bits, thus, bits not containing useful data, in a CAN message.

Another protocol is known which is called the "CAN with flexible data rate" or CAN FD. It uses the bus arbitration process familiar from the CAN, but increases the bit rate by switching over to a shorter bit duration after the end of the arbitration up to the bit CRC delimiter. In addition, the effective data transfer rate is increased by allowing longer data fields. The CAN FD is also a method for the exchange of data between nodes that are connected to each other by a bus system, in which the messages that contain the data are exchanged according to a first communication protocol, the messages are made up of a sequence of bits and within each message that contains data, at least one control bit having a predetermined position within the sequence of bits must have a predetermined value.

CAN FD may be used for general communication, but also in certain operating modes, e.g., for software download or end-of-line programming or for maintenance work.

CAN FD requires two sets of bit-timing configuration registers which define one bit duration for the arbitration phase and a further bit duration for the data phase. The bit duration for the arbitration phase has the same restrictions as in the Norm CAN networks; the bit duration for the data phase may be selected to be shorter in view of the handling capacity of the transceivers selected and the requirements of the CAN FD network.

The transceivers or bus-interface units are assigned the task in the network of converting the logic signals of the communication controller according to the physical link layer provided, to corresponding physical signals on the specific transmission medium. Often, e.g., for CAN as well, the logic signals are represented by generating and transmitting suitable voltage differences as physical signals. This is explained in the following for illustration, using the CAN as example.

For CAN, the logic signals "0" and "1" are usually represented as voltage difference between the two as a rule metallic (e.g., copper) lines of the bus system. In this context, for the representation of a "0", the transceiver usually actively sets a predetermined first differential-voltage level of, e.g., 2 volts by, for instance, allowing a current to flow with the aid of a suitable current source, so that the desired voltage difference ensues. This driven first differential-voltage level cannot be overwritten by another bus node. The level and the corresponding bus state are therefore denoted as "dominant".

To represent a "logic 1", the current is not further driven. A current flows across one or more terminating resistors which are provided at the ends of the bus line between the two wires of the bus system, for example, so that a second differential-voltage level ensues, which corresponds to logic "1". This second differential-voltage level may be zero, but may also be set by suitable voltage sources to a value other than zero. This ensuing second differential-voltage level is able to be overwritten by another bus node with a dominant level. The second level and the corresponding bus state are therefore denoted as "recessive".

In addition, the transceiver continuously ascertains the voltage difference between the two lines, so as by a comparison to threshold values, for example, to determine whether a dominant or recessive bus level exists at the moment.

Figure 1A:
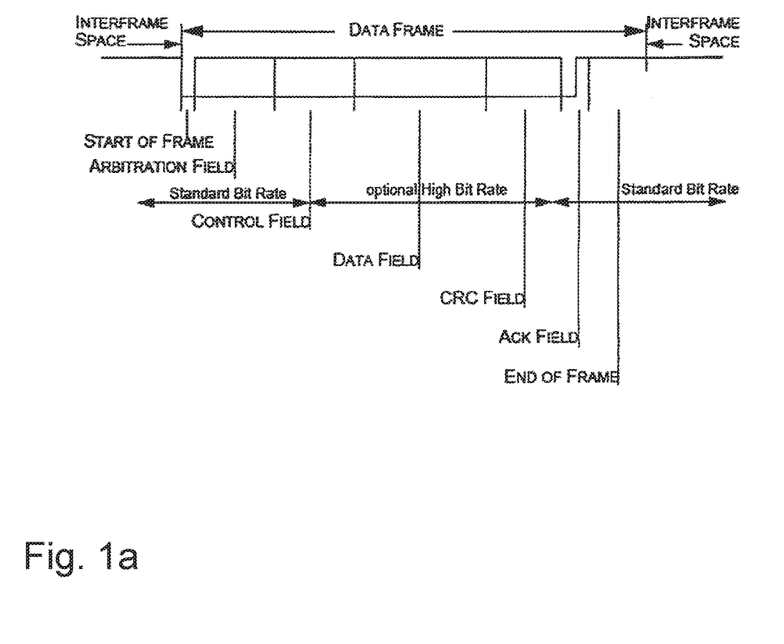
FIG. 1a illustrates the general basic structure of Norm CAN and CAN FD messages.
Figure 1B:
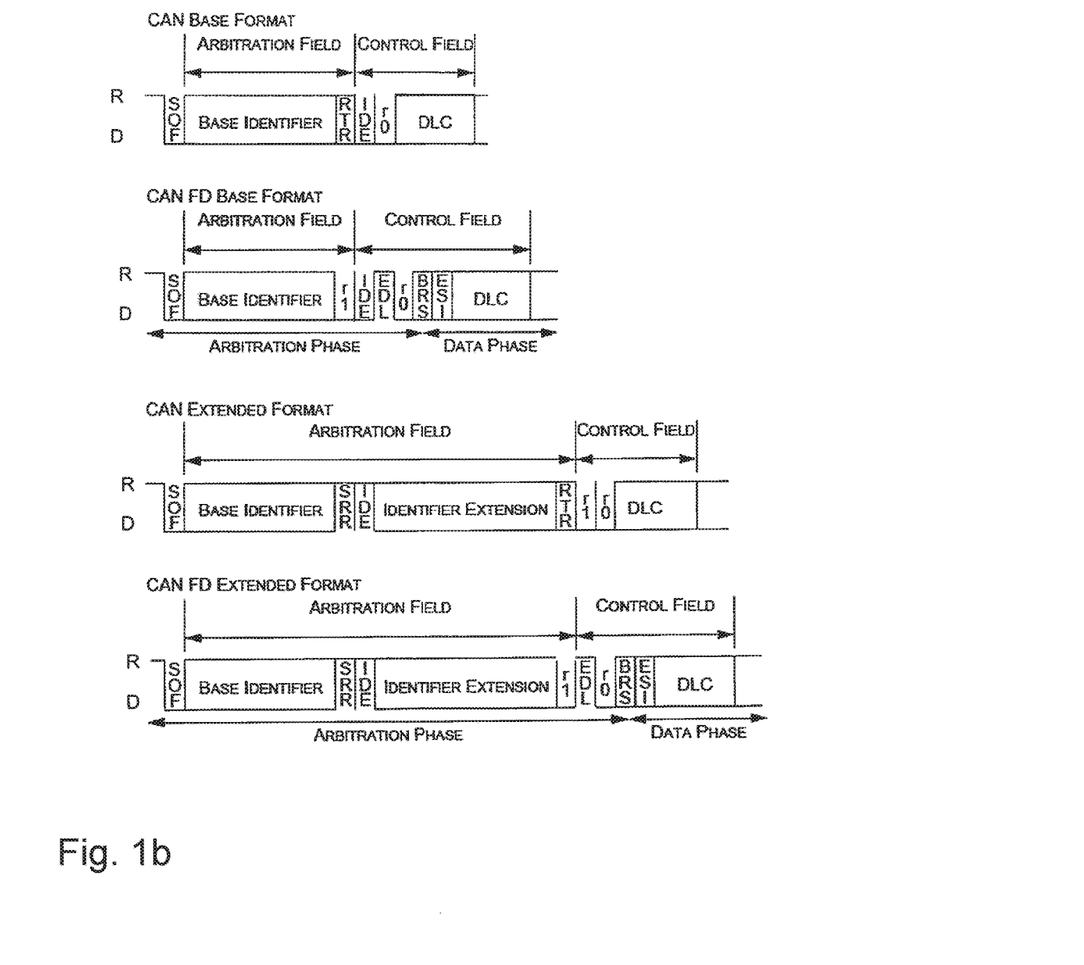
FIG. 1b illustrates the header section, including Start-of-Frame Bit, Arbitration Field and Control Field, of messages according to the Norm CAN protocol and CAN FD protocol, in each case in the standard or base format and in the extended format.

A CAN FD message is made up of the same elements as a Norm CAN message, which differ from each other in detail, however. Thus, the data field and the CRC field may be longer in a CAN FD message. Examples for Norm CAN messages and CAN FD messages are illustrated in FIG. 1.

CAN FD supports both identifier lengths of the CAN protocol, the 11-bit long "standard format", also called "base format", and the 29-bit long "extended format". CAN FD messages have the same structure as Norm CAN messages. Norm CAN messages are distinguished from CAN FD messages by a reserved bit which, in the Norm CAN, is always transmitted dominantly, bears the name "r0" or "r1" and is located in the control field before the data length code. In a CAN FD message, this bit is transmitted recessively and is called EDL. In comparison to Norm CAN messages, additional control field bits follow in the CAN FD messages, for example, the bit BRS which indicates the position at which—provided the BRS bit has a corresponding value—the bit duration in a CAN FD message is switched over to a shorter value. This is represented in FIG. 1 by arrows, which split the messages into a section having the designation "CAN FD data phase", in which the high bit rate or the short bit duration is used, and into two sections having the name "CAN FD arbitration phase", where the lower bit rate, i.e., the longer bit duration is used.

The number of bytes in the data field is indicated by the data length code. This code is 4 bits in size and is transmitted in the control field. The coding in the case of CAN FD is different than in the Norm CAN. The first nine codes (0x0000 to 0x1000) are the same, but the following codes (0x1001 to 0x1111) correspond to larger data fields of the CAN FD messages, e.g., 12, 16, 20, 24, 32, 48 and 64 Bit.

Norm CAN transceivers may be used for CAN FD, special transceivers are optional, and in some instances, may contribute to a further increase of the bit rate in the data phase.

The CAN FD protocol is described in a protocol specification having the title "CAN with Flexible Data-Rate Specification", referred to hereinafter as the CAN FD Specification, which can be downloaded on the Robert Bosch GmbH website M http://www.semiconductors.bosch.de.

So long as unmodified Norm CAN controllers are used, a mixed network of Norm CAN nodes and CAN FD nodes are only able to communicate in the Norm CAN format. That is, all nodes in the network must have a CAN FD protocol controller in order to carry out CAN FD communication. However, all CAN FD protocol controllers are capable of participating in Norm CAN communication.

One reason for this fallback on the slower communication in mixed networks is the monitoring of the communication by the communication nodes, which is partially responsible for the high transmission reliability in CAN bus systems, for example. Since the unmodified Norm CAN controllers are unable to correctly receive the faster data bits of the CAN FD messages, they would destroy these messages by error messages (so-called error frames). Similarly, CAN FD controllers would destroy messages by error frames they would attempt to transmit after arbitration has taken place, e.g., using a bit duration once again shortened with respect to the CAN FD specification or using another bit coding or a deviating protocol. Thus, in general, the transmission rate may be limited by one of the slower nodes in the network, or rather, by its monitoring mechanism.

Particularly when data is to be transmitted between two specific nodes that are set up for a differing, e.g., faster communication protocol, this limitation is not always necessary and may be disadvantageous, especially when it is possible to dispense with the monitoring mechanisms, which would lead to destruction of the differing or faster messages, in the case of this differing communication protocol.

Thus, at least in certain application cases, substantially higher transmission rates may be attained if the monitoring mechanism which brings about the destruction of the messages by error frames is interrupted by suitable mechanisms under certain conditions.

SUMMARY OF THE INVENTION

The present invention provides a method which eliminates this disadvantage by permitting a switchover to a faster or otherwise modified communication using the lines of an existing bus system, and is carried out without the faster transmitted messages being destroyed by other bus nodes.

The subject matter of the present invention is a method for the exchange of data between nodes that are connected to one another by a bus system, in which messages that contain data are exchanged according to a first communication protocol; the messages are made up of a sequence of bits; at least one control bit having a predetermined position within the message, which is exchanged according to the first communication protocol, must have a predetermined value; for each message, one node has the role of transmitter and at least one other node, as receiver, receives the message and monitors the message for errors. The method is characterized in that the transmitter, by transmitting the control bit with a value differing from the predetermined value, transfers at least one first receiver to a protocol exception state, so that it suspends error monitoring, and the transmitter, after transmitting the control bit with a value differing from the predetermined value, begins to transmit further data according to a second communication protocol to at least one second receiver. Accordingly, the control bit having the differing value signals that the communication on the bus line is intended to be switched to a different, e.g., faster communication protocol, for which error monitoring may be suspended. Thus, the behavior method according to the present invention makes it possible to attain the advantage that error monitoring of the at least one receiver does not interfere with or prevent utilization for a faster data transmission.

In one especially advantageous specific embodiment, the values of bits on the bus system are represented by physical signals, physical signals being used for the transmission according to the second communication protocol which differ from the physical signals for the transmission according to the first communication protocol. This makes it simple on the receiver side to separate the communication according to the first protocol from the communication according to the second protocol, and to minimize or avoid a mutual disturbance of the two protocols.

Advantageously, the at least one first receiver remains in the protocol exception state until a resumption condition for the use of the first communication protocol is satisfied. By skillful selection of the resumption condition and the second communication protocol, an unintentional occurrence of the resumption condition may be prevented, so that it is possible to switch purposefully back and forth between the first and second communication protocol.

If physical signals are used for the transmission according to the second communication protocol which are selected in such a way that the resumption condition for the usage of the first communication protocol is not satisfied during the transmission according to the second communication protocol, then the transmission according to the second protocol may be carried out unrestrictedly, without the occurrence of the resumption condition. One especially advantageous development for this is if for the transmission according to the second communication protocol, physical signals are used which, in terms of the first communication protocol, are interpreted like a specific physical signal of the transmission according to the first communication protocol which avoids the occurrence of the resumption condition. In this manner, it is then ensured that the resumption condition does not occur prior to the conclusion of the communication according to the second communication protocol.

In addition, it may be advantageous if, after transmitting the at least one control bit having a value differing from the predetermined value, the transmitter transmits information as to the communication protocol according to which it will transmit the further data, before it begins to transmit the further data according to this communication protocol to at least one second receiver. Particularly if the transmitter and/or the intended receiver is/are set up to utilize several different communication protocols in addition to the first communication protocol, it may be useful before beginning the transmission to communicate which of these communication protocols will be used for the transmission then following, so that the receiver is able to adjust itself to it, for example, by activating a suitable receive unit or implementing a switching mechanism that supplies the signals thereupon received according to the second communication protocol, to the communication device appropriate for them.

It may be beneficial for the method that the at least one first receiver assumes the protocol exception state by restarting a protocol control unit or a protocol state machine. It is further advantageous if a predetermined or predeterminable number of bits having predetermined values or a predetermined or predeterminable period of time that communication is absent on the bus is defined as resumption condition for the utilization of the first communication protocol. This reduces the expenditure for implementing the method in these receivers, since the appropriate mechanism for executing a restart is usually provided in any case. In this context, in some bus systems such as CAN, for example, there is usually a wait for the appearance of a number of bits having predetermined values, particularly recessive bits, in order to synchronize to the existing bus communication again.

The messages to be transmitted according to the first communication protocol advantageously have a header section, a data field and a trailer section, where on the basis of an identifier contained in the header section of the message, it is determined which node will obtain transmit access to the bus when several nodes are attempting simultaneously to transmit a message, the at least one control bit being contained in the header section. Access to the bus for each message is thereby assigned comprehensibly to one defined node, and no collisions of messages occur, which would result in destruction of both colliding messages.

If, according to the second communication protocol, after a suitable start signal, the further data are transmitted as an arbitrary defined sequence of data units such as, for example, a sequence of bytes or 16-bit, 32-bit or 64-bit units or in the UART format or in the FlexRay format or in an Ethernet MAC format, the data are able to be transmitted quickly. In addition, the use of these known message formats results in a higher level of protection for the hardware and software utilized.

The same advantages hold true analogously for the device that contains means for carrying out one of the methods claimed.

As resumption condition for the use of the first communication protocol, advantageously a predetermined or predeterminable number of bits having predetermined values is defined, or a predetermined or predeterminable period of time that communication is absent on the bus is determined.

After the restart, in particular, the at least one receiver may maintain a check on the occurrence of the resumption condition using an edge-detection function and a counter for the appearance of bits having a predetermined value, the counter being restarted upon appearance of an edge. This further reduces the expenditure for realizing the method starting from an implementation that handles the first communication protocol, since after an error-caused restart or at the beginning of the data transmission, the nodes usually synchronize themselves in this manner to the bus communication.

The messages to be transmitted according to the first communication protocol advantageously have a header section, a data field and a trailer section, the data to be transmitted being contained in the data field and the at least one control bit being contained in the header section. The protocol exception state may thereby be assumed early on within the message after reading of the control bit, and if necessary, the transmitter is able to switch to a differing communication protocol.

If the roles of transmitter and receiver are assigned among the nodes by an arbitration process, whereby based on an identifier contained in the header section of the message, it is determined which node will receive transmit access to the bus when several nodes are attempting simultaneously to transmit a message, it is ensured in advantageous manner that no collisions occur in the bus communication. In particular, this may be achieved by the fact that the arbitration process is carried out according to the CAN standard ISO 11898-1, the header section of the message includes a start-of-frame bit, an arbitration field and a control field, and the trailer section of the message has a CRC field, an acknowledge field and an end-of-frame field.

A device which has a suitable arrangement for carrying out a method like the subject matter described herein or the further descriptions herein has the corresponding advantages. In particular, such a device may be used advantageously in mixed networks and contribute there to the rapid and smooth data transmission.

DETAILED DESCRIPTION

FIG. 1a illustrates the general basic structure of Norm CAN and CAN FD messages. The sequence and the designations of the message sections (Start-Of-Frame-Bit, Arbitration Field, Control Field, Data Field, CRC Field, an Ack Field and End-Of-Frame Field) are indicated. Before and after the message, the bus is in the state without data transmission, which is denoted by the term "Interframe Space". As a rule, the English designations are used, as stipulated in the Standard ISO 11898. The bit-rate switchover, which can take place in the case of CAN FD messages, is marked in by sections with "Standard Bit Rate" and "Optional High Bit Rate".

FIG. 1b illustrates the header section, including Start-of-Frame Bit, Arbitration Field and Control Field, of messages according to the Norm CAN protocol and CAN FD protocol, in each case in the standard or base format and in the extended format. In the DATA phase, a bit-rate switchover may take place in the case of CAN FD messages.

Figure 2:
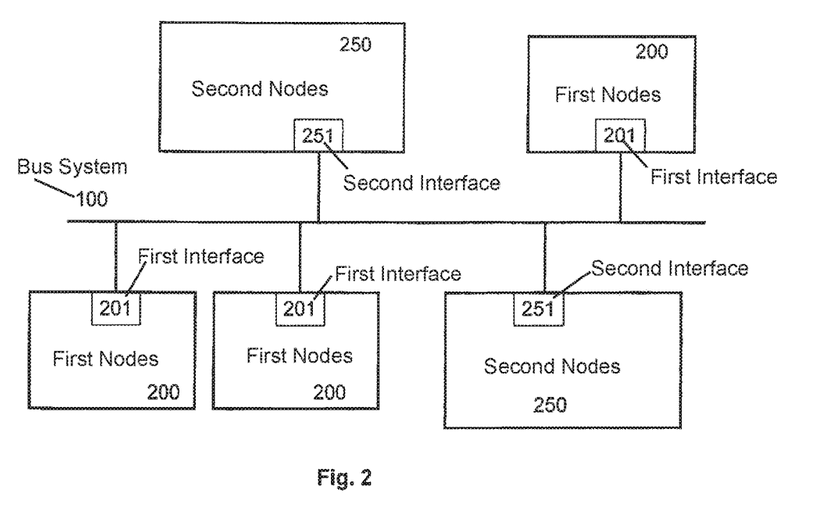
FIG. 2 shows a mixed network of first nodes 200 and second nodes 250.

FIG. 2 shows a mixed network of first nodes 200 and second nodes 250. The nodes are connected by a bus system 100 which, for example, may take the form of a double-wire copper line. The line ends may be terminated by suitable terminating resistors, for example, in order to avoid reflections of the messages.

Other line topologies such as ring-shaped, star-shaped or tree-like topologies, for instance, are also conceivable. The first and second nodes are connected to the bus system by first and second interfaces 201, 251. For example, the interfaces include bus-interface units such as CAN transceivers and communication units such as CAN controllers or CAN FD controllers, for instance. The interfaces may also be shown integrated completely or partially with further components of the nodes. A customary combination, for instance, is the integration of the communication unit in a microprocessor of the node likewise present.

The first nodes are characterized in that, according to the present invention, they are able to assume the protocol exception state, while the second nodes are characterized in that they are able to use a second communication protocol or switch to a second communication protocol. Further nodes may also be connected to the network, provided they do not interfere with the method described. Some of the nodes shown in FIG. 2 may also be optional nodes that are connected only in certain cases, e.g., in the case of maintenance work or programming work.

Figure 3:
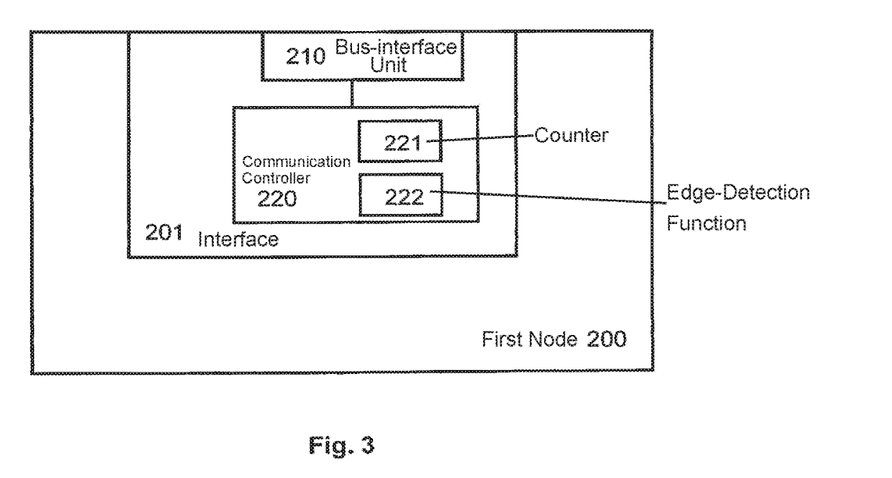
FIG. 3 shows, by way of example, a schematic block diagram of a first node 200 having an interface 201.

FIG. 3 shows, by way of example, a schematic block diagram of a first node 200 having an interface 201. The interface includes a bus-interface unit 210, as well as a communication controller 220. Communication controller 220 contains a counter 221 and an edge-detection function 222.

Figure 4:
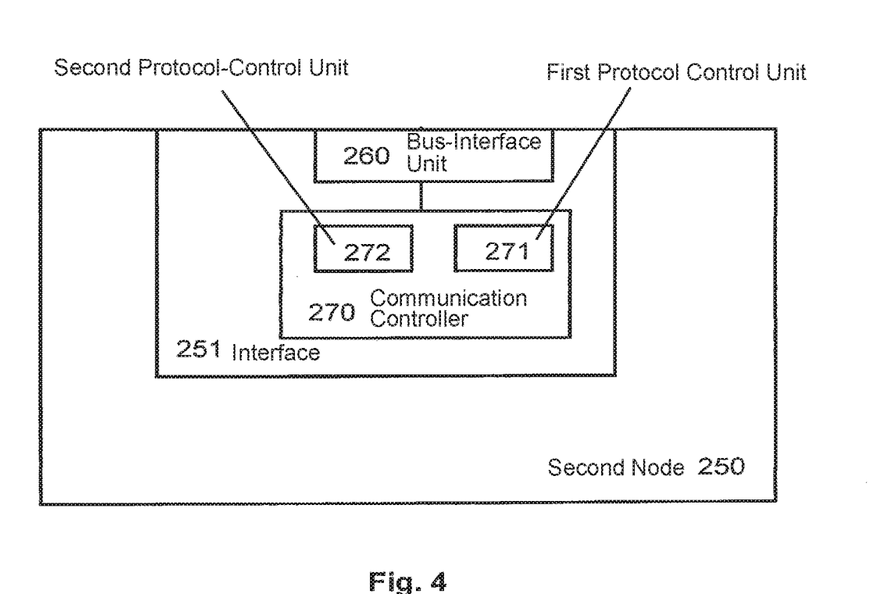
FIG. 4 shows a schematic block diagram of a second node 250 having an interface 251.

FIG. 4 shows, by way of example, a schematic block diagram of a second node 250 having an interface 251. The interface includes a bus-interface unit 260, as well as a communication controller 270 that is equipped to carry out the method of the present invention. To that end, communication controller 270 includes a first protocol-control unit 271 and a second protocol-control unit 272. Two separate communication controllers may also be provided, each of which contains one of the protocol-control units.

Figure 5:
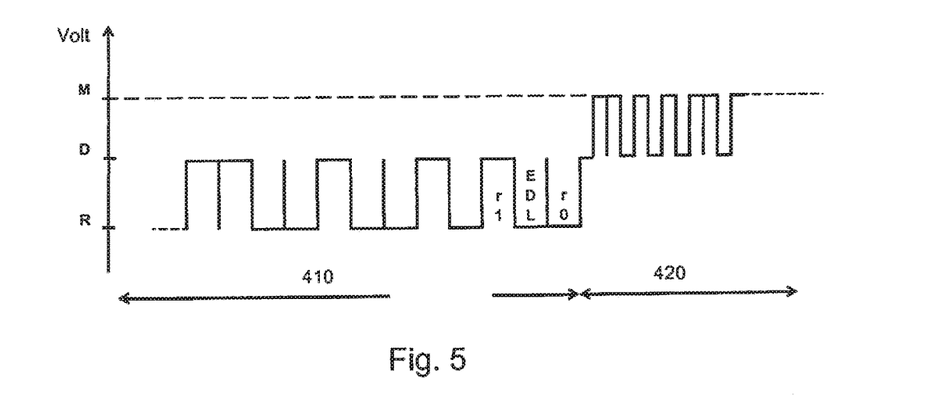
FIG. 5 shows an example for physical signals which are transmitted by the transmitter when using the method of the present invention and a suitable bus-interface unit at the transition from the first to the second communication protocol on the bus lines.

FIG. 5 shows an example for physical signals which are transmitted by the transmitter when using the method of the present invention and a suitable bus-interface unit at the transition from the first to the second communication protocol on the bus lines. The physical signals, here voltages R and D, which are transmitted on the bus in a first time period 410, differ from physical signals D and M, which are transmitted in a second time period 420.

In the following, several exemplary embodiments are described in which the first nodes and the second nodes each use different communication protocols.

Protocol Exception State for Tolerance of CAN Implementations with Respect to CAN FD Messages:

An example for a protocol exception state, which starts out from a Norm CAN network, is described in the following with reference to FIGS. 2 and 3. In this case, first nodes 200 of the network shown in FIG. 2 are control devices, for example, which, as part of an interface 201, have a communication controller 220 with a modified Norm CAN implementation. The second nodes of the network shown in FIG. 2 are control devices here, for example, which, as part of an interface 251, have a communication controller with a CAN FD implementation.

Implementations mean realizations of the communication protocol in hardware or software, thus, for instance, CAN communication controllers or IP modules that contain a CAN communication controller and are able to be integrated in a larger semiconductor device.

By the modification, Norm CAN implementations, which thus, by definition, are not able to transmit and receive CAN FD messages, are enabled to tolerate a communication carried out according to a second differing communication protocol. In the specific embodiment described here, this second differing communication protocol is CAN FD. Tolerance of the differing communication protocol means that these modified Norm CAN implementations ignore and do not interfere with communication proceeding according to the second communication protocol, thus, in this case, CAN FD, by generating error frames, for example. This has the advantage that a switchover from the Norm CAN protocol to the faster second protocol, thus, CAN FD, is made possible, and specifically, using the same bus wires. After the rapid communication according to the second communication protocol CAN FD has concluded, there is a switch back to the original Norm CAN protocol, provided a resumption condition for the use of the first communication protocol, thus, Norm CAN, is satisfied.

For the protocol exception state described here, two existing functions of the CAN protocol are combined in order to make the Norm CAN implementations thus modified tolerant of CAN FD. First of all, a counter 221 is used which is provided in Norm CAN implementations in order to detect the appearance of eleven consecutive recessive bits, when a Norm CAN implementation synchronizes itself to the bus communication. For example, in the Norm CAN, this happens after a restart or upon running through what is termed a "bus off recovery sequence" (see Chapter 7, "Fault Confinement" of the CAN Specification 2.0, Rule 12). Secondly, edge-detection function 222 is used, which checks the input on the CAN-bus side once per CAN-bus unit of time for edges, in order to utilize detected edges as basis for the bit synchronization. (The length of one bit in the case of the CAN bus is made up of a plurality, e.g., between 8 and 25 CAN-bus units of time or "time quanta", whose length in turn is derived from the internal oscillator clock pulse of the specific bus node. Details can be gathered from the CAN Specification 2.0.)

A CAN implementation modified according to the example described here uses the following mechanism: At first, the modified CAN implementation participates as usual in the communication, that is, if a message exists for sending, by transmitting the header section of the message, it attempts to attain access to the bus within the framework of the arbitration. If there is nothing to transmit, or if it loses the arbitration, it observes the bus traffic as receiver. Immediately after detecting a recessive bit at bit position r0 in a received Norm CAN message with standard format, or after detecting a recessive bit at bit position r1 in a received Norm CAN message with extended format (corresponding to the position of the EDL bit of a CAN FD message, see FIGS. 1a and 1b), the modified Norm CAN implementation restarts its state machine (protocol-state machine) responsible for the protocol decoding or the protocol control unit provided for this purpose, e.g., a protocol control unit realized in hardware, without altering its error counter and without transmitting an error frame. In this way, it assumes a protocol exception state, in which it waits for the occurrence of a resumption condition. In response to the occurrence of the resumption condition, a resumption process is run through, as described in greater detail hereinafter.

Alternatively, instead of the r0 bit in the case of the standard format or instead of the r1 bit in the case of the extended format, a different bit having a fixed value may be used within the norm CAN message for the initiation of the protocol exception state, such as the r0 bit in the extended format, for example.

Protocol Exception State:

In the protocol exception state, first of all, the protocol state machine or the protocol control unit is restarted. After the restart, the node waits for a sequence of, in this example, eleven consecutive recessive bits using counter 221 provided for this purpose, which counts bits with a predetermined value. No recessive to dominant flank is allowed to occur within this sequence, otherwise counter 221 restarts. This is monitored by available edge-detection function 222.

Resumption Process:

When, for example, using counter 221 and edge-detection function 222, the resumption condition, thus, a sequence of eleven consecutive recessive bits in the present example, is detected, the node leaves the protocol exception state, and synchronizes itself to the bus communication. Consequently, the node is ready again for transmitting or receiving Norm CAN messages, whose beginning is signaled by a dominant START OF FRAME bit.

The advantage of the mechanism described is that it ensures that the modified Norm CAN nodes wait until the CAN FD message has been transmitted (or until it has been interrupted by an error frame, if an error is detected by a CAN FD node), for during the transmission of the CAN FD message, the requirement of a sequence of eleven consecutive recessive bits is never satisfied, and the modified Norm CAN nodes do not run through a resumption process as was described above. Thus, the method described makes it possible for the modified Norm CAN implementations to tolerate all CAN FD messages.

It is advantageous that the bit duration within the DATA phase of the CAN FD message (see FIG. 1) is not shorter than one CAN-bus unit of time of the CAN FD arbitration phase. Otherwise, in rare cases, eleven consecutive recessive bits could inadvertently be read out by the modified Norm CAN node in a CAN FD message.

The detection of a CAN FD message causes no increment of the error counter, so that the modified Norm CAN implementations are able to continue the bus communication according to the Norm CAN protocol immediately after the faster CAN FD message has ended.

Protocol Exception State for Tolerance of Modified CAN FD Implementations with Respect to Messages According to Further-Developed Protocols:

Another example for a protocol exception state which starts out from a CAN FD network is described in the following, again with reference to FIGS. 2 and 3. In this case, first nodes 200 of the network shown in FIG. 2 are control devices, for example, which have a unit, thus, as illustrated in FIG. 3, as part of an interface 201, have a communication controller 220 with a modified Norm CAN FD implementation. Second nodes 250 of the network shown in FIG. 2 are control devices in this example which, as part of an interface 251, have a communication controller that includes an implementation of a further communication protocol. For example, the further communication protocol may be a further development of the CAN FD protocol that, for instance, as a function of the content of the data length code, allows even longer data fields than are provided in the CAN FD. Furthermore, additional control bits are conceivable in the control field, e.g., for the purpose of data protection or to transmit additional status information among the nodes. Alternatively or additionally, the further communication protocol may provide a modified calculation for the content of the CRC field and/or a differing size of the CRC field. A plurality of communication controllers may also be provided, of which one carries out the CAN FD communication, and a second implements the further communication protocol.

The CAN FD protocol according to the published specification also has bits having predetermined values at a few predetermined positions within the message. As shown in FIG. 1b, for example, a CAN FD message in the standard format as well as in the extended format, in each case contains one reserved bit r1 as last bit in the arbitration field and one reserved bit r0, which follows the EDL bit, in the control field.

Accordingly, the mechanism which was described above for modified Norm CAN implementations may be employed analogously on modified CAN FD implementations. To that end, the modified CAN FD implementations must contain the two mechanisms which are used for this, namely, on one hand, counter 221 for, in this example, eleven consecutive recessive bits, and on the other hand, edge-detection function 222. This is usually given. In other exemplary embodiments, different mechanisms may be employed which are used for the resumption of communication after a restart or error detection, and which may be reused for carrying out the method.

The CAN FD implementation modified for the example of a protocol exception state described here now uses the following mechanism: At first, the modified CAN FD implementation participates as usual in the communication, that is, if a message is present for sending, by transmitting the header section of the message, it attempts to attain access to the bus within the framework of the arbitration. If there is nothing to transmit, or if it loses the arbitration, it observes the bus traffic as receiver. Immediately after detecting a recessive bit at bit position r0 in a CAN FD message with standard format, or after detecting a recessive bit at bit position r0 in a CAN FD message with extended format (see FIGS. 1a and 1b), the modified CAN FD implementation restarts its state machine (protocol-state machine) responsible for the protocol decoding or the protocol control unit provided for this purpose, e.g., a protocol control unit realized in hardware, without altering its error counter and without transmitting an error frame. In this way, it assumes a protocol exception state, in which it waits for the occurrence of a resumption condition. The resumption condition and the resumption process thereby initiated look essentially the same as already described earlier for the first exemplary embodiment. CAN FD implementations usually have the analogous mechanisms, thus, especially a counter 221 for recessive bits and a flank-detection function 222, which may be used for this purpose.

Alternatively, instead of the r0 bit in the case of standard format or extended format for the initiation of the protocol exception state, a different bit having a fixed value within the CAN FD message may also be used, like the r1 bit at the end of the arbitration field, for instance.

The advantage of the mechanism described is that it is thus ensured that the modified CAN FD nodes wait until the message according to the further communication protocol has been transmitted (or until it possibly has been interrupted by a corresponding mechanism, if an error is detected). The prerequisite is that the further communication protocol be developed in such a way that the requirement of a sequence of eleven consecutive recessive bits is not satisfied during the transmission, and the modified CAN FD nodes therefore do not run through a resumption process as was described above. Thus, the method described makes it possible for the modified CAN FD implementations to tolerate the messages that are transmitted according to the further communication protocol.

Use of the Protocol Exception State for Tolerance of Modified Norm CAN Implementations or CAN FD Implementations with Respect to Protocol Switchover:

According to the present invention, the protocol exception state described may be used in mixed networks to switch from one protocol to a differing communication protocol that satisfies different demands than the first communication protocol. Because of the tolerance of the first nodes in the protocol exception state, second nodes are able to exchange or transmit data using this differing communication protocol without interference by the first nodes. This is explained in the following by way of example. The example starts out from a Norm CAN network or CAN FD network, however, the invention may also be described starting out from other networks which satisfy the features in the preamble of claim 1.

One specific embodiment of the present invention, which starts out from a Norm CAN network or a CAN FD network, is described in the following, now with reference to FIGS. 2, 3 and 4. In this case, first nodes 200 of the network illustrated in FIG. 2 are control devices, for example, which, as shown in FIG. 3, as part of an interface 201, have a communication controller 220 with a modified Norm CAN implementation or a modified CAN FD implementation. For the most part, these first nodes do not differ from the first nodes of the two previous examples for the protocol exception state. Both modified Norm CAN implementations as well as modified CAN FD implementations may also be present as first nodes.

In this further example, second nodes 250 of the network shown in FIG. 2 are control devices which, as part of an interface 251, have a communication controller 270 that, according to the present invention, is able to switch between Norm CAN communication or CAN FD communication and at least one further communication protocol or communication mode. Such a node is illustrated schematically in FIG. 4. Communication controller 270 includes a first protocol control unit 271 for the Norm CAN protocol or CAN FD protocol, and a second protocol control unit 272 for the at least one further communication protocol. In an alternative form of the invention, which is not shown in FIG. 4, a plurality of separate communication controllers may also be provided, of which one executes the Norm CAN communication or CAN FD communication, and at least one further communication controller realizes the further communication protocol(s). In this case, a connection may be supplied between the first and the second communication controller or the further communication controllers, so that the first communication controller is able to inform the second or further communication controllers when a condition is present for the use of the second or further communication protocol.

If there is mention of a second communication protocol within the context of the present invention, in the case of several further communication protocols or communication controllers, this is to be understood as one of the further communication protocols.

The further communication protocol must be transmittable over the bus lines provided for the CAN communication, and may not contain any sections which look like a sequence of eleven consecutive recessive bits for a modified Norm CAN controller or for a CAN FD controller. After a suitable start signal, the further data may be transmitted as an arbitrary defined sequence of data units, e.g., as a sequence of bytes or 16-bit, 32-bit or 64-bit units, or in the UART format or in the FlexRay format or in an Ethernet MAC format. In principle, any communication protocol may be used which is able to be represented as a sequence of voltage levels on a double-wire line and which satisfy the conditions indicated.

If such a second node 250 would like to transmit data over the network according to a further communication protocol, then as per the example of the present invention described here, it uses the following mechanism: It participates in the communication according to the Norm CAN protocol or CAN FD protocol and, by transmitting the header section of a Norm CAN message or CAN FD message, attempts to gain access to the bus within the framework of the arbitration. By selection of a sufficiently low-value identifier corresponding to a sufficiently high priority, it is possible to ensure that this succeeds when it is necessary. After losing the arbitration, the other nodes of the bus communication assume a role as receiver.

The second node, which is the transmitter of the message, now transmits data in the message which lead to the first nodes being transferred into a protocol exception state. As described in the preceding examples, this may be accomplished by transmitting a recessive bit at bit position r0 or r1 in a CAN FD message with standard format, or by transmitting a recessive bit at bit position r0 or r1 in a CAN FD message with extended format (see FIGS. 1a and 1b). If there are modified Norm CAN nodes among first nodes 200, then, because of the recessive level of the EDL bit of the transmitted header section of a CAN FD message, they are already assuming the protocol exception state. The CAN FD nodes among first nodes 200 assume the protocol exception state on the basis of the recessive level at the position of the r0 bit or r1 bit.

After all first nodes 200 are transferred into the protocol exception state, the second node, which is the transmitter of the message, begins transmitting data using the further communication protocol. For this, it has switchable communication controller 270 or a switching mechanism for switching between several provided communication controllers, as already explained. The switchover may take place immediately after sending the last bit, which is necessary for the transfer of the first nodes into the protocol exception state, as illustrated in FIG. 5, for example. It may also take place with a time delay of a predetermined or predeterminable number of tail bits, for example. In this case, in terms of bit duration or physical realization, the tail bits may be defined as voltage difference between the bus lines according to the marginal conditions of the first communication protocol. By providing such tail bits, information may also be transmitted, for instance, that indicates the further communication protocol according to which data will be transmitted after the switchover. This is especially advantageous when the second node, which is the transmitter of the message, is equipped for transmitting data according to several further communications protocols.

First nodes 200 remain in the protocol exception state until the resumption condition occurs. The second node, which is the transmitter of the message, is thereby able to send data according to the further communication protocol, which one or more further nodes are able to receive, provided they are equipped for it. The further second nodes, which are not transmitters, receive the data transmitted according to the further communication protocol. It may also be provided that after the data transmission according to the further communication protocol has concluded, they likewise wait for a resumption condition for the communication according to the first communication protocol, just like the first nodes. However, by information contained in the transmitted data, for example, they may also be switched over actively again for the communication according to the first communication protocol. In this case, it is assumed that within the course of the communication with the aid of the further communication protocol, the resumption condition, thus, e.g., a sequence of eleven consecutive recessive bits, does not appear. If the communication with the aid of the further communication protocol is concluded, the bus line remains free of data, so that the resumption condition occurs, and the first nodes and the second nodes are able to initiate a communication again according to the Norm CAN protocol or CAN FD protocol.

Individual nodes of the network may be set up for rapid communication in the manner delineated, while other nodes, namely, first nodes 200 of the network, only have to be changed minimally, as described above. For example, one central control device or central gateway which contains extensive software, e.g., for controlling the communication, could exchange data with at least one programming device, service device or input device, which is connected for that purpose, or receive data from it without interference by the other nodes on the network. A plurality of control devices set up for it could also exchange data via the mechanism described with at least one programming device, service device or input device, which is connected for that purpose, or receive data from it. In this context, the data may be transmitted in succession or sectionally in succession or alternately or perhaps concurrently, e.g., by using several mutually separable frequency bands in the case of the further communication protocols employed. Furthermore, it would be conceivable to use the method to transmit data from messages, which are exchanged according to the first communication protocol, additionally as data according to the second communication protocol for the purpose of redundancy or encryption. Thus, for reasons of redundancy, certain selected messages may be transmitted additionally in a differing format, or data may be sent in connection with an encryption (e.g., code or encrypted data or encryption information).

In order to ensure that in the course of the communication with the aid of the further communication protocol, the resumption condition, thus, e.g., a sequence of eleven consecutive recessive bits, does not occur, the physical link layer of the further communication protocol or of the further communication protocols may also be adapted with respect to the link layer of the first communication protocol:

For this, a new type of transceiver 260 may be used, for example, which is equipped in such a way that in addition to the physical signals of the first communication protocol, it is also able to generate and ascertain further physical signals of at least one further communication protocol, which are so distinct that a response of the resumption condition is effectively avoided. For example, this may be achieved by the fact that for the transmission according to the second communication protocol, physical signals such as differential-voltage levels are used, for instance, which in terms of the first communication protocol, thus, for example, in the communication controller provided for the first communication protocol, are interpreted like a specific physical signal of the transmission according to the first communication protocol which avoids the occurrence of the resumption condition. If, as described further above, the resumption condition is defined as a predetermined or predeterminable number of bits having predetermined values, e.g., of consecutive recessive bits, then the transmission according to the second communication protocol may use physical signals, for instance, which, in terms of the first communication protocol, are interpreted as bits deviating from it, thus, e.g., as dominant bits. This is explained in greater detail in the following example with reference to FIG. 5.

For instance, starting from a customary CAN transceiver, it could be introduced that the new-type transceiver recognizes not only the two levels "recessive" and "dominant" familiar from CAN, but also at least one additional level (e.g., "maximum"), for example:

Recessive level R: The transceiver of the transmitter drives no current. Voltage difference between the bus lines 0 Volts, for example.

Dominant level D: With the aid of suitable means, e.g., a current source, the transceiver of the transmitter drives a current, so that the normal Norm CAN voltage difference ensues. Voltage difference between the bus lines 2 Volts, for example.

Maximum level M: With the aid of suitable means, e.g., a current source, the transceiver of the transmitter drives a stronger current, so that a higher voltage difference ensues. Voltage difference between the bus lines 4 Volts, for example.

The first two levels are recognized by all participant Norm CAN, CAN FD and new-type transceivers as recessive R and dominant D, respectively. The third level is recognized by all customary CAN and CAN FD transceivers as dominant D, and by the new-type transceiver as maximum M.

FIG. 5 shows an example for physical signals which the new-type transceiver of the transmitter is able to generate at the transition from the first to the second communication protocol on the bus lines. In a first section 410, the communication takes place according to the first communication protocol. The physical signals are differential-voltage values of 0 volts or 2 volts, corresponding to recessive level R or dominant level D. In a second section 420, the communication takes place according to the second communication protocol. The physical signals are differential-voltage values of 2 volts or 4 volts, corresponding to maximum level M or dominant level D.

New-type transceiver 260 has an additional output, for example, which is connected to the communication controller modified according to the present invention and possibly to the further communication controller which implements the further communication protocol(s). For example, "Universal Asynchronous Receiver Transmitter" (UART) or FlexRay could be used as protocol, but also in principle, any other serial communications protocol, e.g., an Ethernet MAC format, as well. A different logic signal is transmitted to the communication controller, depending upon whether the bus level is ascertained as "maximum" M or "dominant" D. Thus, once the second node, which is the transmitter of the message, has transferred first nodes 200 into the protocol exception state, transmission is subsequently carried out only in the two levels "maximum" and "dominant". The Norm Can controller and CAN FD controller thereby only ever ascertain a dominant bus level at the receive output of the transceiver. The resumption condition of eleven consecutive recessive bits does not occur so long as data are transmitted in this manner. This holds true without there being any restrictions in the possible transmitted data formats of the second communication protocol. Naturally, several additional levels like, for example, "maximum 1" and "maximum 2", etc., may also be specified. Provided the new-type transceiver is capable of reliably differentiating these levels, a corresponding coding having several levels may be used for the transmission. Suitable methods are known from Ethernet networks, for example.

The switchover between the at least two driven levels "dominant" D and "maximum" M described has the further advantage that the transmitted bits may be transmitted with shorter bit duration, since the steepness of the edges is no longer a function of how a voltage level sets in through across the terminating resistors.

Only the bus nodes which use the further communication protocol need to be equipped with the new-type transceivers. The remaining bus nodes may use conventional transceivers. Instead of the switchover between dominant and "maximum" level, one could also keep the CAN bus at the dominant level and modulate the ASC data by suitable means.

What is claimed is:

1. A method for exchanging data between nodes that are connected to each other by a bus system, the method comprising:
exchanging messages, which contain data, according to a first communication protocol, the messages being made up of a sequence of bits, wherein at least one control bit which has a predetermined position within the message, which is exchanged according to the first communication protocol, has a predetermined value;
for each message, one node is a transmitter and at least one other node is a receiver, receiving the message and monitoring the message for errors;
wherein by transmission of the control bit having a value differing from the predetermined value, at least one first receiver is transferred into a protocol exception state, so that it suspends error monitoring, and
wherein the transmitter, after transmitting the control bit having a value differing from the predetermined value, begins to transmit further data according to a second communication protocol to at least one second receiver.

2. The method of claim 1, wherein values of bits on the bus system are represented by physical signals, which are used for the transmission according to the second communication protocol which differ from the physical signals for the transmission according to the first communication protocol.

3. The method of claim 1, wherein the at least one first receiver remains in the protocol exception state until a resumption condition for the utilization of the first communication protocol is satisfied.

4. The method of claim 3, wherein physical signals are used for the transmission according to the second communication protocol which are selected so that during the transmission according to the second communication protocol, the resumption condition for the utilization of the first communication protocol is not satisfied.

5. The method of claim 3, wherein physical signals are used for the transmission according to the second communication protocol which, in terms of the first communication protocol, are interpreted like a specific physical signal of the transmission according to the first communication protocol which avoids the occurrence of the resumption condition.

6. The method of claim 1, wherein after transmitting the at least one control bit having a value differing from the predetermined value, the transmitter transmits information as to the communication protocol according to which it will transmit the further data, before it begins to transmit the further data according to this communication protocol.

7. The method of claim 1, wherein the at least one receiver assumes the protocol exception state by restarting a protocol control unit or a protocol state machine.

8. The method of claim 3, wherein a predetermined or predeterminable number of bits having predetermined values is defined as resumption condition for the utilization of the first communication protocol.

9. The method of claim 3, wherein a predetermined or predeterminable period of time that communication is absent on the bus is defined as resumption condition for the utilization of the first communication protocol.

10. The method of claim 1, wherein the messages to be transmitted according to the first communication protocol have a header section, a data field and a trailer section, it being determined based on an identifier contained in the header section of the message, which node will obtain transmit access to the bus when several nodes are attempting simultaneously to transmit a message, the at least one control bit being contained in the header section.

11. The method of claim 1, wherein according to the second communication protocol, after a suitable start signal, the further data are transmitted as an arbitrary, defined sequence of data units or in the UART format or in the FlexRay format or in an Ethernet MAC format.

12. The method of claim 1, wherein the further data according to the second communication protocol are transmitted concurrently to a plurality of receivers, using several mutually separable frequency bands.

13. The method of claim 1, wherein data from messages which are exchanged according to the first communication protocol, are additionally transmitted as data according to the second communication protocol for the purpose of redundancy or encryption.

14. A device for exchanging data between nodes which are connected to each other by a bus system, comprising:
a data exchange arrangement to exchange messages which contain data according to a first communication protocol, the messages being made up of a sequence of bits, wherein at least one control bit having a predetermined position within the message, which is exchanged according to the first communication protocol, has a predetermined value; and a transmitting arrangement, upon presence of the control bit having a value differing from the predetermined value, to transmit further data according to a second communication protocol.

15. The device of claim 14, further comprising:

a transfer arrangement to transfer at least one first receiver into a protocol exception state so that it suspends monitoring the message for errors, the transmitting arrangement transmitting the control bit having a value differing from the predetermined value.

16. The device of claim 14, further comprising:

a receiver, upon reception of the control bit having a value differing from the predetermined value, to receive the further data according to the second communication protocol.

17. The device of claim 14, wherein after sending the control bit having a value differing from the predetermined value, information is transmitted as to the second communication protocol according to which the further data will be transmitted.

18. A bus-interface unit for use with device for exchanging data between nodes which are connected to each other by a bus system, comprising:

a bus-interface arrangement to transmit physical signals according to a second communication protocol which differ from physical signals for the transmission according to a first communication protocol;

wherein the device for exchanging data between the nodes which are connected to each other by the bus system, includes:

a data exchange arrangement to exchange messages which contain data according to the first communication protocol, the messages being made up of a sequence of bits, wherein at least one control bit having a predetermined position within the message, which is exchanged according to the first communication protocol, has a predetermined value; and a transmitting arrangement, upon presence of the control bit having a value differing from the predetermined value, to transmit further data according to the second communication protocol.

19. The bus-interface unit of claim 18, wherein the physical signals for the transmission according to the second communication protocol are selected so that during the transmission according to the second communication protocol, a resumption condition for the utilization of the first communication protocol is not satisfied.

20. The bus-interface unit of claim 18, wherein physical signals are used for the transmission according to the second communication protocol which, in terms of the first communication protocol, are interpreted like a unique physical signal of the transmission according to the first communication protocol.

* * * * *